United States Patent
Bremner

(10) Patent No.: US 6,886,650 B2
(45) Date of Patent: May 3, 2005

(54) ACTIVE SEAT SUSPENSION CONTROL SYSTEM

(75) Inventor: Ronald Dean Bremner, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 108 days.

(21) Appl. No.: 10/293,787

(22) Filed: Nov. 13, 2002

(65) Prior Publication Data

US 2004/0089488 A1 May 13, 2004

(51) Int. Cl.⁷ .......................... B62D 33/06; F16M 13/00
(52) U.S. Cl. ..................... 180/89.13; 248/550
(58) Field of Search ....................... 180/89.13; 248/550, 248/421, 424

(56) References Cited

U.S. PATENT DOCUMENTS

| | | | |
|---|---|---|---|
| 3,233,886 A | | 2/1966 | Saffell et al. ................. 267/1 |
| 3,701,499 A | | 10/1972 | Schubert et al. ......... 244/17.27 |
| 3,951,373 A | | 4/1976 | Swenson et al. ............. 248/400 |
| 4,198,025 A | | 4/1980 | Lowe et al. ................. 248/550 |
| 4,363,377 A | | 12/1982 | Van Gerpen ................. 180/282 |
| 4,382,573 A | * | 5/1983 | Aondetto ..................... 248/561 |
| 5,044,455 A | | 9/1991 | Tecco et al. ............. 180/89.13 |
| 5,732,370 A | * | 3/1998 | Boyle et al. .................... 701/37 |
| 5,810,125 A | * | 9/1998 | Gezari ...................... 188/266.2 |
| 5,941,920 A | | 8/1999 | Schubert ....................... 701/37 |
| 5,975,508 A | * | 11/1999 | Beard .......................... 267/136 |
| 6,000,703 A | | 12/1999 | Schubert et al. ......... 280/5.518 |
| 6,059,253 A | * | 5/2000 | Koutsky et al. ............. 248/550 |
| 6,082,715 A | * | 7/2000 | Vandermolen ............... 267/131 |
| 6,120,082 A | * | 9/2000 | Vandermolen .............. 296/68.1 |
| 6,264,163 B1 | * | 7/2001 | Ivarsson ...................... 248/588 |
| 6,371,459 B1 | * | 4/2002 | Schick et al. ................ 267/131 |

OTHER PUBLICATIONS

Grimm, et al., An Active Seat Suspension System For Off–Road Vehicles, Div. of Control Engineering. U of Saskatchewan (date unknown).

McCormac et al., "Dual–Axis Active Seat Suspension System", ASAE Paper No. 89–7542, Dec. 1989.

Ho, et al., "Microprocessor Controlled Active Seat Suspension System For Off–Road Vehicles", National Conference on Fluid Power, 1984.

* cited by examiner

Primary Examiner—Paul N. Dickson
Assistant Examiner—Laura B. Rosenberg

(57) ABSTRACT

A suspension system supports a seat with respect to a base mounted on a frame of a vehicle. The system includes a hydraulic actuator coupled between the seat and the base. A single accelerometer is attached to the base and generates a base acceleration signal in response to motion of the base. A control unit actively controls the hydraulic actuator as a function of the base acceleration signal. The control unit generates a base velocity signal by integrating the base acceleration signal, generates a seat position signal representing a position of the seat relative to the base, generates a seat position error signal representing a difference between a desired position and the seat position signal, and generates a command signal as a function of the velocity signal and of the position error signal. The control unit controls the actuator by applying the command signal thereto.

1 Claim, 3 Drawing Sheets

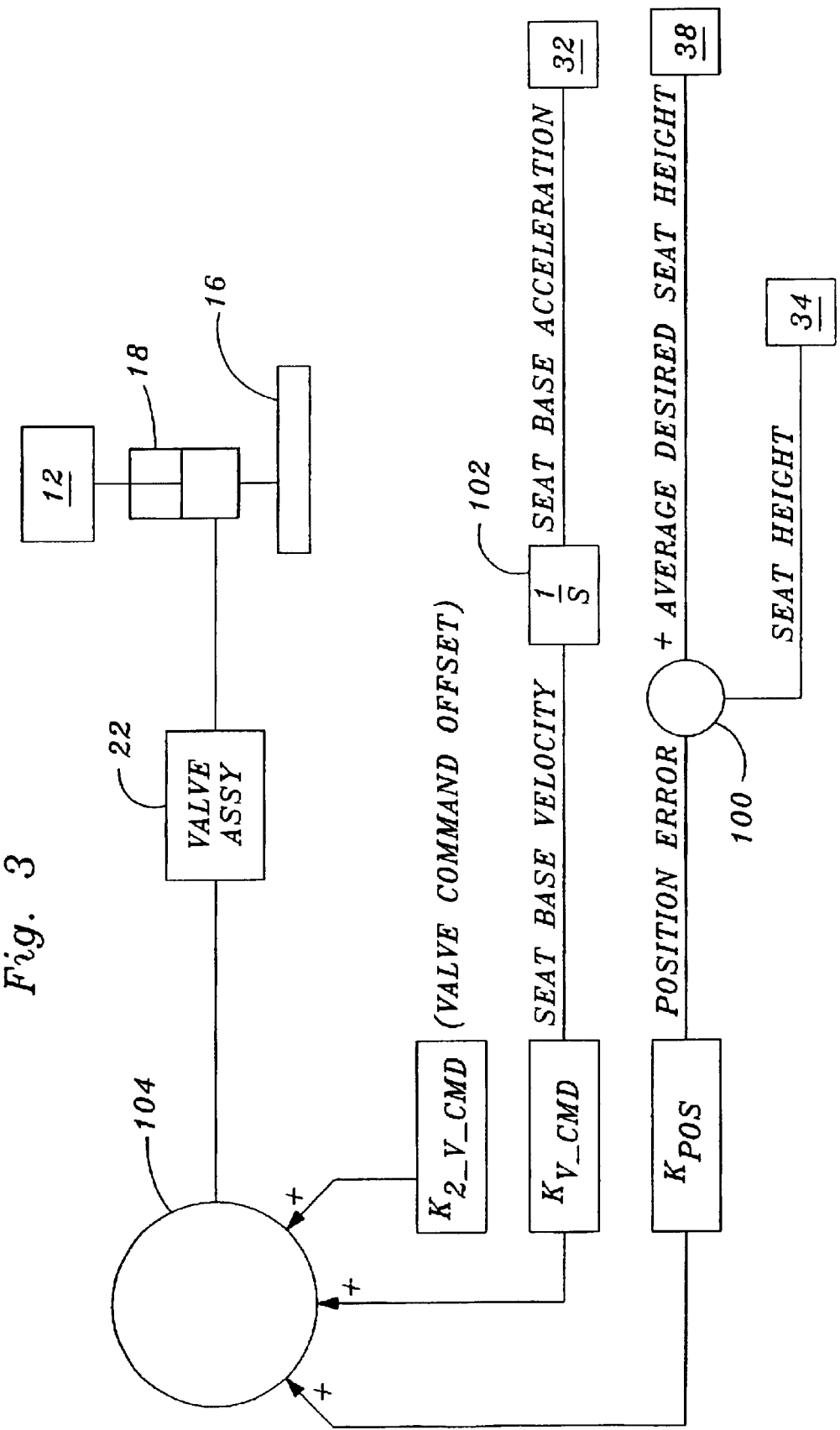

ACTIVE SEAT SUSPENSION CONTROL SYSTEM

BACKGROUND OF THE INVENTION

The invention relates to a seat suspension system which isolates a vehicle seat from vibrations.

Passive suspension systems, such as for a vehicle seat, are known. For example, John Deere production 6000, 7000, 8000 and 9000 Series tractors have passive seat suspension systems which include a hydraulic shock absorber in parallel with an air bag.

Active suspension systems are known which include an electro-hydraulically controlled actuator working in parallel with a resilient device, such as a spring. For example, U.S. Pat. No. 4,363,377 (Van Gerpen), issued Dec. 14, 1982, discloses an active seat suspension system with a hydraulic actuator in parallel with a spring. A control system controls fluid communication to the actuator in response to a seat position signal, a stiffness control, a seat height control and a gain control. U.S. Pat. No. 6,000,703 (Schubert et al.), issued Dec. 14, 1999, discloses an active cab or seat suspension control system with a hydraulic actuator in parallel with a pneumatic air spring or air bag. U.S. Pat. No. 6,371,459, issued to Applicant's assignee, describes an active seat suspension system wherein an accelerometer is attached to the seat. However, with an accelerometer attached to the seat, the system cannot respond until an acceleration of the seat occurs and is sensed. Also, such an accelerometer must be connected to wires or cables which are constantly being flexed and which require special care in routing.

A system for controlling the pitch of a truck cab is described in U.S. Pat. No. 5,044,455 (Tecco et al.), issued 3 Sep. 1991. However, this system requires at least front and back acceleration sensors in order to generate cab or frame pitch acceleration signals. Furthermore, such a system cannot control simple vertical acceleration of the cab relative to the frame, it can only control pitch or pivotal acceleration.

SUMMARY

Accordingly, an object of this invention is to provide an active seat suspension system which does not require an accelerometer attached to the seat.

This and other objects are achieved by the present invention, wherein an active suspension system for supporting a mass, such as a seat supported on a base which is fixed to a frame of a vehicle, includes a hydraulic actuator coupled between the seat and the base and a control system which actively controls the hydraulic actuator. The control system actively controls the hydraulic actuator as a function of a seat position error signal, and an acceleration signal generated by an acceleration sensor which is attached to the seat base.

BRIEF DESCRIPTION OF THE DRAWINGS

FIG. 3 is a schematic block diagram illustrating the seat suspension system of FIG. 1.

DETAILED DESCRIPTION

Figure 1:
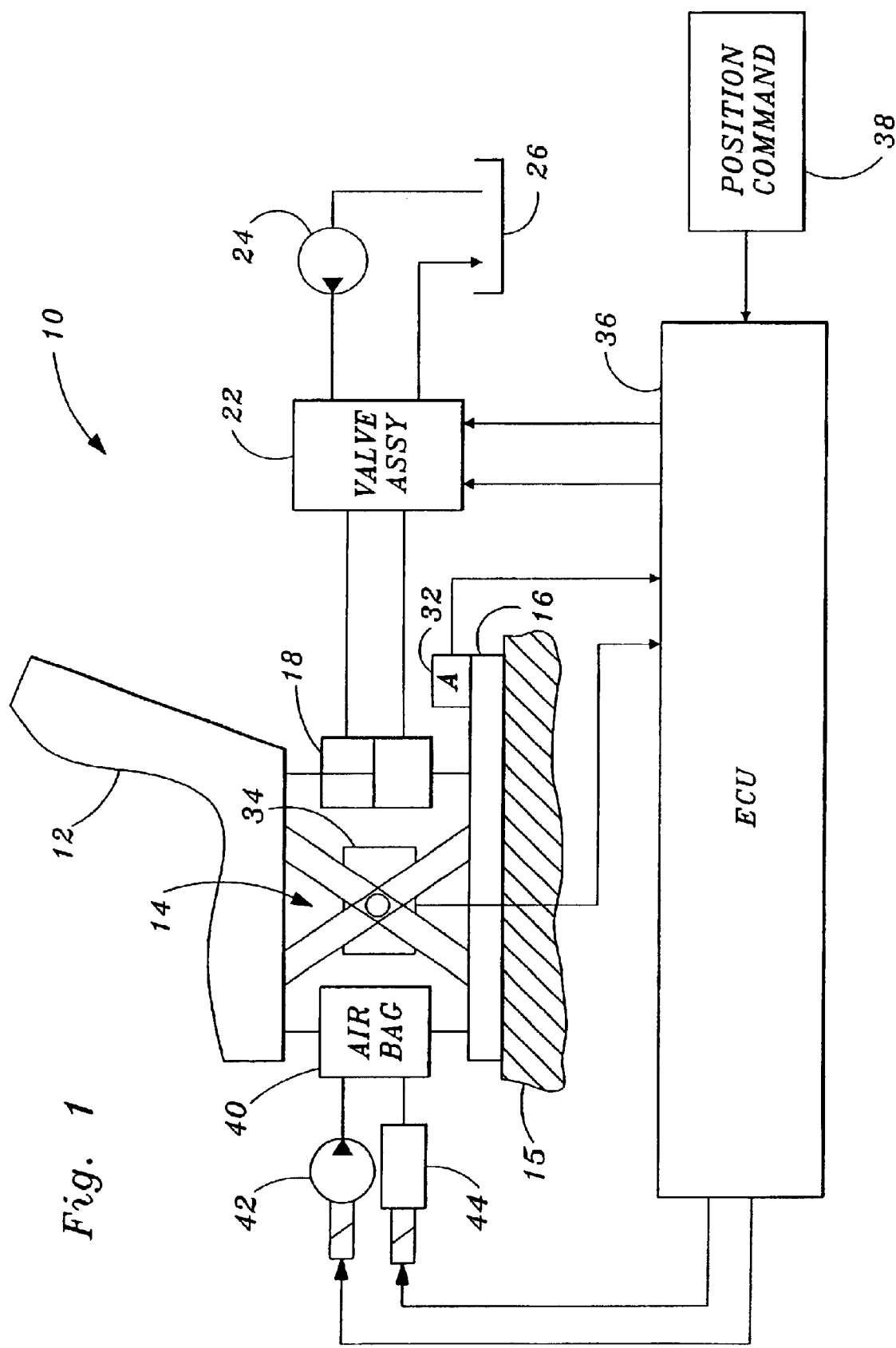
FIG. 1 is a simplified schematic diagram of a seat suspension system according to the present invention.

Referring to FIG. 1, an active seat suspension system 10 includes a seat 12 supported by scissors linkage 14 above a seat base 16 which is fixed relative to a frame 15 of a vehicle. Also coupled between the seat 12 and the base 16 are a hydraulic piston or actuator 18. A servo device such as a hydraulic circuit or valve unit 22 controls fluid communication between the actuator 18, a pump 24 and a reservoir or sump 26. The valve unit 22 and the actuator 18 cooperate so that the velocity of the actuator 18 will be proportional to the magnitude of the signal applied to the input of the valve unit 22.

A single accelerometer 32, such as a commercially available silicon capacitive variation transducer, is attached to the seat base 16, and generates an acceleration signal representing the simple vertical acceleration of the base 16. A seat position sensor 34, such as a ratio-metric, rotary Hall-effect transducer, is coupled to the linkage 14. An electronic control unit (ECU) 36 receives signals from sensors 32 and 34, from a manually operable control 38 which generates a position command signal. In response to these inputs, the ECU 36 provides a valve command or control signal to the valve unit 22.

An air bag 40 may also be coupled between the seat 12 and the base 16. The air bag 40 may be controlled by an electronically controlled air compressor 42 and an electronically controlled vent valve 44, both controlled by the ECU 36 as described in U.S. Pat. No. 6,371,459, which is incorporated by reference herein.

Figure 2:
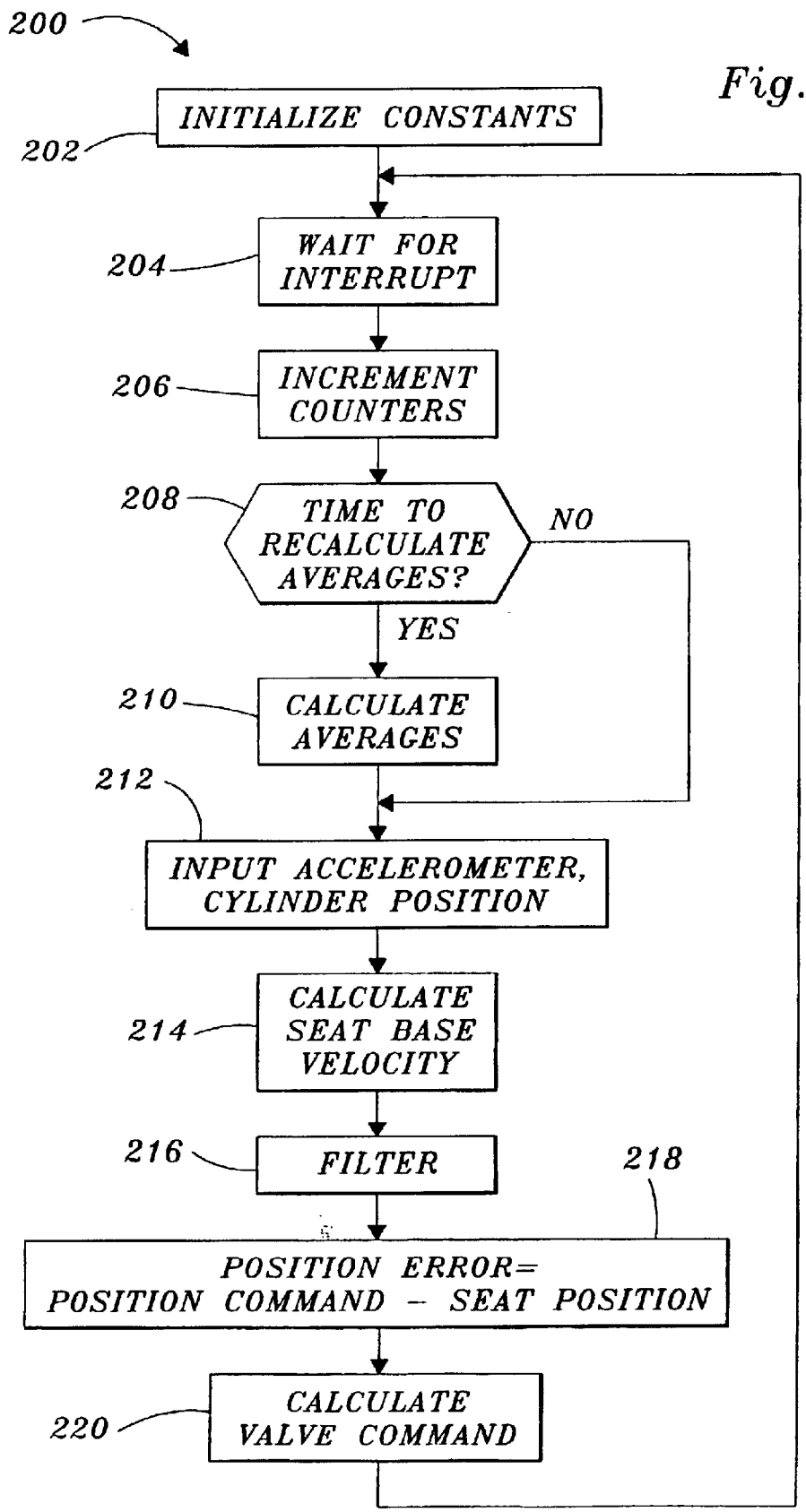
FIG. 2 is a logic flow diagram illustrating an algorithm performed by the electronic control unit of FIG. 1.

The ECU 36 executes an algorithm 200 represented by FIG. 2. Conversion of this flow chart into a standard language for implementing the algorithm described by the flow chart in a digital computer or microprocessor, will be evident to one with ordinary skill in the art.

At step 200 various constants for the accelerometer 32, the seat height sensor 34, a velocity compensation parameter, a valve command, gain, offset and filtering, are initialized and stored in non-volatile memory (not shown) in the ECU 36.

Step 204 causes the algorithm to wait for an interrupt signal which occurs at regular time intervals, such as every 4 milliseconds, for example. The interrupt interval is preferably based upon processor capability and hardware requirements. Step 206 performs maintenance functions, such as incrementing counters (not shown) which are used to determine when filtering and other routines should be run.

If it is the appropriate time to recalculate averages, step 208 directs the algorithm to step 210, else to step 212.

Step 210 calculates an average of the accelerometer signal and adjusts the constants based on the response of the cylinder 18 to the valve command signal to compensate for drift of the accelerometer and to compensate for variations in cylinder response. The constants may also be adjusted to compensate for variations of voltage, hydraulic pressure and other parameters.

Step 212 inputs data from the accelerometer 32 and position sensor 34. If desired, other data may be received, such as voltage, hydraulic pressure, etc.

Step 214 calculates the velocity of the seat base 16 by integrating the signal from accelerometer 32 for the most recent time interval.

Step 216 performs various filtering functions, such as filtering the seat base velocity value because the valve 22 cannot respond to high frequencies, and canceling low frequencies. Seat position, cylinder velocity, voltage and hydraulic pressure signals could also be filtered. Such filtering may be accomplished via software filters in algorithm 200 or by analog filters (not shown) or a combination thereof.

Step 218 calculates a seat Position_Error value by subtracting the position command from the sensed seat position.

Step 220 generates the valve command according to this equation:

$$\text{VALVE COMMAND} = \text{Filtered base Velocity} \times K\_V\_CMD + K2\_V\_CMD + \text{Position}\_\text{Error} \times K\_Pos,$$

where K_V_CMD is predetermined valve command constant, K2_V_CMD is a valve command offset constant, and K_Pos is gain constant.

The resulting system operates to limit vibration of seat 12 with the accelerometer 32 attached to the seat base 16, not the seat 12. With this algorithm the command sent to the valve 22 is not based on a complicated equation which attempts to cancel acceleration. Instead, the system determines the velocity caused by the acceleration and then cancels most of that velocity. The above described algorithm is simple for the ECU to execute, thus providing a rapid response and minimal acceleration of the seat. It is not possible to cancel all of the seat velocity, as that would require that the seat stay at the same height, relative to the center of the earth.

The constants can be adjusted adaptively if the cylinder 18 does not respond in a linear manner to the command, if different cylinders have different responses, or if these responses vary over time. In other words, if the response of cylinder 18 to velocity commands is slower or faster than desired, the constants could be changed to achieve the desired response. If the gain of the valve vs. cylinder velocity command is non-linear, or varies with seat position, then a table of constants, or an equation relating response to command could be stored in a memory of the ECU 36.

This control system could be implemented through the use of an analog controller, or a hybrid circuit (combination of analog and digital controller), although an analog system would be more difficult to make adaptive. Referring to FIG. 3, a position error signal is generated by a difference unit 100 which receives a desired seat height signal from operator control 38 and the seat height signal from sensor 34. The position error is multiplied by Kpos and applied to summing unit 104. An integrator 102 converts the base acceleration signal from sensor 32 into a base velocity signal. The velocity signal is multiplied by Kv_cmd and applied to summing unit 104. The valve command offset K2_v_cmd is also applied to summing unit 104. The output of summing unit 104 is applied to an input of valve unit 22 ??? which inturn controls the velocity of actuator or cylinder 18.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. An active suspension system for supporting a seat on a base of a vehicle, comprising:

an actuator coupled between the seat and the base for moving the seat relative to the base;

a single accelerometer attached to the base and generating a single base acceleration signal in response to vertical motion of the base; and a control unit which converts the single base acceleration signal into a control signal, and actively controls the actuator as a function of the control signal, the control unit generating a base velocity signal by integrating the base acceleration signal, the control unit generating a seat position signal representing a position of the seat relative to the base, the control unit generating a seat position error signal representing a difference between a desired position and the seat position signal, the control unit generating the control signal as a function of the base velocity signal and of the position error signal, and the control unit controlling the actuator by applying the control signal thereto, the control unit generates the control signal according to the following equation:

$$\text{VALVE COMMAND} = \text{Filtered base Velocity} \times K\_V\_CMD\ K2\_V\_CMD + \text{Position}\_\text{Error} \times K\_Pos,$$

where K_V_CMD is predetermined valve command gain constant, K2_V_CMD is a valve command offset constant and K_Pos is gain constant.

* * * * *